(12) United States Patent
Vogtmeier et al.

(10) Patent No.: US 8,515,013 B2
(45) Date of Patent: Aug. 20, 2013

(54) GRID AND METHOD OF MANUFACTURING A GRID FOR SELECTIVE TRANSMISSION OF ELECTROMAGNETIC RADIATION, PARTICULARLY X-RAY RADIATION

(75) Inventors: Gereon Vogtmeier, Aachen (DE); Ralf Dorscheid, Kerkrade (NL)

(73) Assignee: Koninklijke Philips N.V., Eindhoven (NL)

( * ) Notice: Subject to any disclaimer, the term of this patent is extended or adjusted under 35 U.S.C. 154(b) by 204 days.

(21) Appl. No.: 13/055,512

(22) PCT Filed: Aug. 6, 2009

(86) PCT No.: PCT/IB2009/053429
§ 371 (c)(1),
(2), (4) Date: Jan. 24, 2011

(87) PCT Pub. No.: WO2010/016026
PCT Pub. Date: Feb. 11, 2010

(65) Prior Publication Data
US 2011/0122999 A1 May 26, 2011

(30) Foreign Application Priority Data
Aug. 8, 2008 (EP) .................................... 08104997

(51) Int. Cl.
*G21K 1/10* (2006.01)

(52) U.S. Cl.
USPC ........................................................ 378/154

(58) Field of Classification Search
USPC .......................... 378/147–150, 154, 155, 157
See application file for complete search history.

(56) References Cited

U.S. PATENT DOCUMENTS

| 3,823,002 | A | 7/1974 | Kirby et al. |
| 5,418,833 | A | 5/1995 | Logan |
| 2003/0072415 | A1* | 4/2003 | Eidam et al. ................. 378/154 |
| 2005/0161189 | A1 | 7/2005 | Sercombe et al. |

FOREIGN PATENT DOCUMENTS

| GB | 2345295 | 7/2000 |
| WO | WO2008007309 | 1/2008 |

* cited by examiner

*Primary Examiner* — Irakli Kiknadze

(57) ABSTRACT

A grid (1) for selective transmission of electromagnetic radiation and a method for manufacturing such grid is proposed. Therein, the grid (1) comprises a structural element with walls (3) comprising a plurality of particles (19) of a radiation-absorbing material wherein the particles (19) are sintered together such that pores (21) are present between neighboring particles (19). The pores (21) are at least partially filled with a second solid material. The filling of the pores (21) can be done by inserting the second material in a liquid, preferably molten form into the pores. The second material can be itself radiation-absorbing as well and may help to both, increase the mechanical stability of the grid and to enhance the radiation-absorbing properties.

11 Claims, 3 Drawing Sheets

GRID AND METHOD OF MANUFACTURING A GRID FOR SELECTIVE TRANSMISSION OF ELECTROMAGNETIC RADIATION, PARTICULARLY X-RAY RADIATION

FIELD OF THE INVENTION

The present invention relates to a grid for selective transmission of electromagnetic radiation, in particular X-ray radiation, to a method of manufacturing such grid and to a medical imaging device comprising such grid.

BACKGROUND OF THE INVENTION

Grids for selective transmission of electromagnetic radiation may be used for example in medical imaging devices such as computed tomography scanners (CT), standard X-ray scanners like C-arm, mammography, etc., single photon emission computed tomography devices (SPECT) or Positron Emission Tomography scanners (PET). Other devices, such as non-destructive X-ray testing devices, may also use such grids. The grid may be positioned between a source of electromagnetic radiation such as X-ray radiation and a radiation-sensitive detection device. For example, in a CT scanner, the source of electromagnetic radiation may be an X-ray tube whereas in SPECT/PET a radioactive isotope injected into a patient may form the source of electromagnetic radiation. The radiation-sensitive detection device may be any arbitrary radiation detector such as a CCD-device, a scintillator based detector, a direct converter etc. A grid may be used to selectively reduce the content of a certain kind of radiation that must not impinge onto the radiation-sensitive detection device. The radiation reduction is usually being realized by means of radiation absorption. In a CT scanner, the grid may be used to reduce the amount of scattered radiation that is generated in an illuminated object as such scattered radiation may deteriorate the medical image quality. As today's CT scanners often apply cone-beam geometry, hence illuminate a large volume of an object, the amount of scattered radiation is often superior to the amount of the medical information carrying non-scattered primary radiation. For example, scattered radiation can easily amount to up to 90% or more of the overall radiation intensity, depending on the object.

Therefore, there is a large demand for grids that efficiently reduce scattered radiation. Grids that do fulfil this demand may be grids that have radiation absorbing structures in two dimensions that are called two-dimensional anti-scatter-grids (2D ASG). As such two-dimensional anti-scatter-grids may need to have transmission channels that are focussed to a focal spot of the radiation source that emits the primary radiation which shall be allowed to be transmitted through the grid, it may be time-consuming and costly to manufacture such grid.

WO 2008/007309 A1, filed by the same applicants as the present application, describes a grid for selective transmission of electromagnetic radiation with structural elements built by selective laser sintering. Therein, a method for manufacturing a grid comprises the step of growing at least a structural element by means of selective laser sintering from a powder material, particularly a powder of an essentially radiation-opaque material. Selective laser sintering allows for a large design freedom. Having a structural element that is built by selective laser sintering, the grid can be a highly complex three-dimensional structure that is not easily achievable by conventional moulding or milling techniques.

However, the mechanical stability as well as the radiation-absorbing properties of conventional sintered grids may have to be further improved. Furthermore, the manufacturing of such sintered grids may have to be further simplified.

SUMMARY OF THE INVENTION

Accordingly, there may be a need for a grid for selective transmission of electromagnetic radiation and for a method of manufacturing such grid as well as for a medical imaging device using such grid wherein the mechanical stability and/or the radiation-absorbing properties of the grid are further improved. Furthermore, there may be a need for a method of manufacturing a grid which allows to simplify the manufacturing process.

These needs may be met by the subject-matter according to one of the independent claims. Advantageous embodiments of the present invention are described in the dependent claims.

According to a first aspect of the present invention a method of manufacturing a grid for selective transmission of electromagnetic radiation is proposed. The method comprises: providing a structural element comprising a plurality of particles comprising a first radiation absorbing material wherein the particles are sintered together and pores are present between neighbouring particles; inserting a liquid second material into the pores; and solidifying the second material.

According to a second aspect of the present invention, a grid for selective transmission of electromagnetic radiation is proposed. The grid comprises a structural element comprising a plurality of particles of a first radiation absorbing material wherein the particles are sintered together such that pores are present between neighbouring particles and wherein the pores are at least partially filled with a second solid material.

According to a third aspect of the present invention, a medical imaging device such as a CT-scanner, X-ray C-arm system, X-ray mammography system, a SPECT-scanner or a PET-scanner comprising a grid according to the above second aspect of the present invention is proposed.

A gist of the present invention may be seen as being based on the following idea:

A core of a grid for selective transmission of electromagnetic radiation may be provided as a structural element which is prepared by sintering particles to each other wherein the particles comprise a radiation-absorbing material. For this purpose, the well-known selective laser sintering (SLS) process, sometimes also referred to as direct metal laser sintering (DMLS), may be used. Thereby, complex two-dimensional or three-dimensional structures may be realized for the structural element.

However, after the sintering process, pores of non-filled spaces remain between the sintered particles. It is the finding of the inventors of the present invention that such pores may deteriorate the mechanical stability and integrity of the structural element and that, furthermore, these pores may reduce the radiation-absorbing properties of the grid. The inventors therefore propose to fill the pores with a second material. Such filling may be achieved by inserting the second material in a liquid form such that it may flow into the pores. Afterwards, the inserted liquid material may be solidified such that it may enhance the mechanical stability of the entire grid.

It may be specifically advantageous to use a radiation absorbing material as the second material such that the second material filled into the pores further adds to increase the radiation absorbing properties of the entire grid. At the surface of the structural element, the inserted second material furthermore may help to smoothen the rough surface provided by the sintered particles of the first material thereby providing smooth wall surfaces for the structural element which then might enhance the radiation absorbing properties of the entire grid.

Furthermore, the proposed method allows to start with a rather rough structural element prepared from particles having a large particle size. On the one hand, the use of such large particles may simplify the laser sintering process. On the other side, due to the large size of the particles, also the pores between the particles may have a large size and the surface of the structural element may be very uneven or rough. However, as the pores are subsequently filled with a second material being preferably radiation absorbing, no empty large pores may deteriorate the mechanical stability and/or radiation absorbing properties of the grid. Therefore, the entire manufacturing process may be simplified due to the larger possible particle size while at the same time maintaining or even increasing the mechanical and radiation-absorbing properties.

In other words, the proposed concept may be seen as an improved method for precise and cost-effective production of for example two-dimensional anti-scatter-grids for X-ray and computed tomography detectors but also for other applications. The approach combines the use of prefabricated anti-scatter-grids, e.g. manufactured by laser sintering technology. The second manufacturing step may be the dipping of the prefabricated structure in a liquid radiation absorbing metal. The method provides a maximum design freedom and an optimization for X-ray absorption and mechanical stability as well as production speed and costs. The method could be also used for the fabrication of many other small but high precision devices where the combination of prefabricated laser sintered walls dipped into a liquid medium offers more density and/or mechanical stiffness.

In the following, further possible features, details and advantages of embodiments of the present invention are mentioned.

The structural element provided as a starting core for the grid may be provided in any two-dimensional or three-dimensional geometry which is suitably adapted for selectively transmitting electromagnetic radiation. For example, the structural element may have vertical walls which are slightly tilted such as to be directed to a focal point of a source for the electromagnetic radiation. Surfaces of the structural element may be curved, e.g. spherically shaped. Particularly, a two-dimensional grid having focused channels may have a spatially rather complex structure. The channels may have a rectangular or hexagonal inner shape which requires channel walls having different angulations.

The particles from which the structural element is formed by sintering comprise a first radiation-absorbing material, preferably an X-ray absorbing material. Therein, it may depend on the application and/or on the structure size, e.g. the thickness of radiation absorbing channel walls, whether the powder material formed by the particles can be considered as radiation-transparent or radiation-absorbing or radiation-opaque. Herein, the term radiation-transparent shall be defined as absorbing a, referred to a specific application, insignificant portion, e.g. less than 10%, of the incident radiation upon transition through the grid. The term radiation-absorbing shall be defined as absorbing a significant portion, e.g. more than 10%, and the term radiation-opaque shall be defined as absorbing essentially all, e.g. more than 90%, of the incident radiation upon transition through the grid. In mammography applications, X-ray energies of about 20 keV may be used. For these energies, copper (Cu) can be considered as essentially radiation-opaque which means that grid walls fulfilling the requirements of certain geometry parameters like wall thickness (e.g. 20 µm), channel height (e.g. 2 mm) etc. lead to absorption of the kind of radiation that is to be selectively absorbed so that a noticeable improvement of a quality parameter of the radiation detection occurs. A quality parameter may be the scatter-radiation-to-primary-radiation ratio (SPR), the signal-to-noise ratio (SNR) or the like. For CT applications in the range of e.g. 120 keV, molybdenum (Mo) or other refractory materials (e.g. tungsten) can be considered as essentially radiation-opaque but other materials like copper or titanium are likewise essentially radiation-opaque if the structure is made in the appropriate thickness. Consequently, the material particles or powder may be considered as radiation-opaque if the resulting grid has satisfying selective radiation transmission properties. For example, while pure plastic materials are usually to be considered as radiation-transparent for all ranges of medically relevant X-ray energies, metal powder-filled plastics may be considered radiation-opaque provided that the powder content is sufficiently high. As the sintered structural element is directly made from a radiation-absorbing or radiation-opaque material, the required radiation-absorbing properties of the grid are inherent to the sintered structural element.

For sintering the radiation-absorbing particles together, the well-known selective laser sintering (SLS) process may be used. In SLS, a powder material is sintered together using a fine laser beam of appropriate energy. The object to be made is sintered layer by layer and the resulting object is subsequently immersed in the powder material so that a next layer of powder material can be sintered on top of the already sintered structures. In this way, rather complex three-dimensional structures can be formed, e.g. having cavities, combinations of convex and concave structural elements, etc. Selective laser sintering allows for generating fine structures from e.g. molybdenum powder by selectively illuminating the top powder layer with a high-intensity laser beam. The grain size of the metal powder may be chosen according to the required structure size and surface roughness. Typical structure sizes (channel wall thickness) for e.g. CT grids are about 50 µm to 300 µm such that grain sizes of about 1 µm-10 µm may suffice. For PET/SPECT devices, typical structure sizes (channel wall thickness) may be about 100 to 1000 µm so that grain sizes of about 5 to 50 µm may suffice. For regular X-ray applications, typical structure sizes may be about 10 to 50 µm so that grain sizes of about 0.1 to 5 µm may suffice. These numbers are only exemplary and shall not be understood as limiting.

As a liquid second material to be filled into the pores of the sintered structural element, any material can be used that can be suitably liquefied such that it can flow into the pores. Preferably, the second material should be adapted such that, after solidifying the second material, it can help to enhance the mechanical stability of the structural element. For this purpose, the second material may have sufficient mechanical rigidity and may further be adapted to suitably adhere to the particles of the first radiation absorbing material.

Preferably, the second material comprises or consists of a radiation-absorbing material, preferably an X-ray absorbing material, such as for example a metal such as silver, lead or copper and their alloys e.g. tin-antimony-lead alloy (Lettermetal). Such radiation-absorbing material filled into the pores of the structural element may further enhance the radiation-absorbing properties of the structural element and thereby further enhancing the selective transmission of electromagnetic radiation of the entire grid. Furthermore, the liquid second material will not only flow into pores deep inside the structural element but will also at least partially fill open pores at the surface of the structural element thereby reducing the surface roughness of the structural element. The thereby smoothened surface of the structural element may further enhance the transmission properties of the entire grid.

The liquid second material may be inserted into the pores by dipping or diving the structural element into a bath of liquefied material. Thereby, the liquid material may flow into the pores or cavities of the sintered structural element and fill these pores up to nearly 100%.

The liquid material may be liquefied by melting. For example, a metal having a low melting point can be heated above its melting point thereby creating a liquid melt into which the structural element may then be dipped. It may be advantageous if the melting temperature of the second material is lower than the melting temperature of the first radiation-absorbing material of the particles forming the structural element. The structural element can then be easily dipped into the melted second material and may remain therein until all pores or cavities are essentially filled with the melted second material. The second material will then solidify upon cooling after withdrawal from the melt.

Alternatively, the second material may be a liquid or resin comprising small radiation-absorbing particles, e.g. in the nano- or micro-scale. The liquid or resin may be filled into the pores and may subsequently be cured.

According to a further embodiment of the present invention, the structural element has minimum structure dimensions and the particles of the first radiation-absorbing material have a maximum particle size being larger than 10%, preferably larger than 20% and even more preferably larger than 25% of the minimum structure dimensions. In other words, the structural element forming the core of the grid may have partial structures having different dimensions in different extension directions. For example, it may have vertical longitudinal walls having a wall thickness wherein the wall thickness is much smaller than the longitudinal extension of the wall and therefore forms a minimum structure dimension. For example, the wall thickness can be between 10 and 1000 µm. Accordingly, the particles which are used to form such partial structures must have a particle size being substantially smaller than the minimum structure dimensions. In conventional grids being formed by selective laser sintering, very small particles are usually used for forming the partial structures in order to avoid large pores or voids within the partial structures. Particle sizes being smaller than 5% of the minimum structure dimensions has been conventionally used. With the manufacturing method proposed herein, the size of the pores between neighbouring particles is much less critical than in the prior art as the pores may be subsequently be filled with a second material. Accordingly, the structural element may be sintered using larger particles having sizes of e.g. 10% or more preferred up to 25% of the wall thickness which may substantially simplify the sintering process.

It shall be noted that the "maximum particle size" is referred to as the size the largest particles contained in a powder have. Usually, a powder has particles of different sizes. In conventional grid building techniques it may be preferred to use powders with mainly small particles to reduce the number and size of pores. However, a small portion of larger particles may not significantly deteriorate the overall result whereas to many large particles may lead to a very porous grid structure. With the method presented herein, powders having many large particles, wherein e.g. 90% of all particles are larger than 10% of the minimum structure dimensions of the grid, may be used without significant detrimental effect on the resulting grid.

Finally, some features and advantages of the present invention are repeated in another wording. An essential feature of the proposed manufacturing method may be seen in a post-processing of sintered geometries. The "rough" sintered feature may be dipped into a bath of e.g. liquid silver to fill the still porous wall structure. The liquid material would go into the cavities and so the surface would be much smoother. Silver as material also absorbs X-rays and so the efficiency of the wall structure would be higher. The stability may increase and also the production efficiency of the sinter process may be improved. This may be because the grain size could be bigger and also the laser power could be used more efficiently and the laser focus could be bigger. So, the wall may be built with more rough grains and the finishing step may compensate this again.

It has to be noted that aspects and embodiments of the present invention have been described with reference to different subject-matters. In particular, some embodiments have been described with reference to the method type claims whereas other embodiments have been described with reference to apparatus type claims. However, a person skilled in the art will gather from the above and the following description that, unless other notified, in addition to any combination or features belonging to one type of subject-matter also any combination between features relating to different subject-matters, in particular between features of the apparatus type claims and features of the method type claims, is considered to be disclosed with this application.

BRIEF DESCRIPTION OF THE DRAWINGS

Features and advantages of the present invention will be further described with respect to specific embodiments as shown in the accompanying figures but to which the invention shall not be limited.

The drawings in the figures are only schematically and not to scale. Similar elements in the figures are referred to with similar reference signs.

DETAILED DESCRIPTION OF PREFERRED EMBODIMENTS

Figure 1:
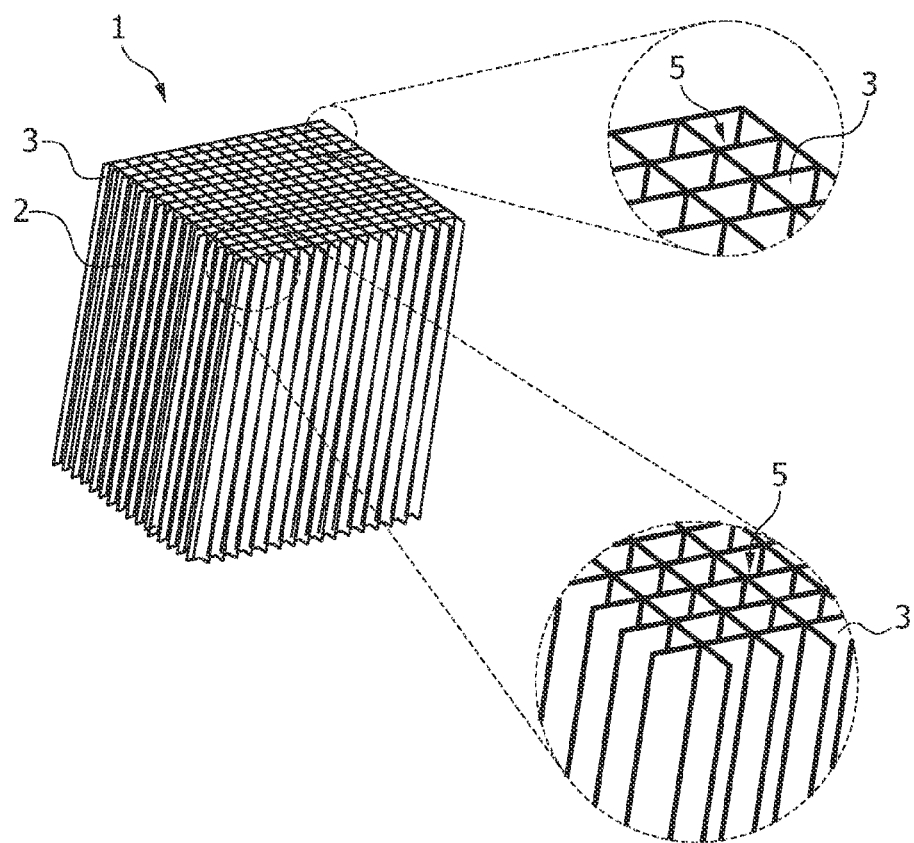
FIG. 1 shows an elevated perspective view of a grid structure including channels according to an embodiment of the present invention.

An exemplary embodiment of a method of manufacturing a grid for selective transmission of electromagnetic radiation according to the invention will be described with reference to FIGS. 1, 2 and 4.

A grid 1 comprises a 3-dimensional structural element 2 including vertical walls 3 arranged perpendicular to each other. As can be clearly seen in the enlarged portions of FIG. 1, the walls 3 form longitudinal channels 5 though which electromagnetic radiation can easily pass. However, radiation which is irradiated under an angle not parallel to the channels 5 will be absorbed within the walls 3 as the walls 3 comprises a radiation-absorbing material.

Figure 2:
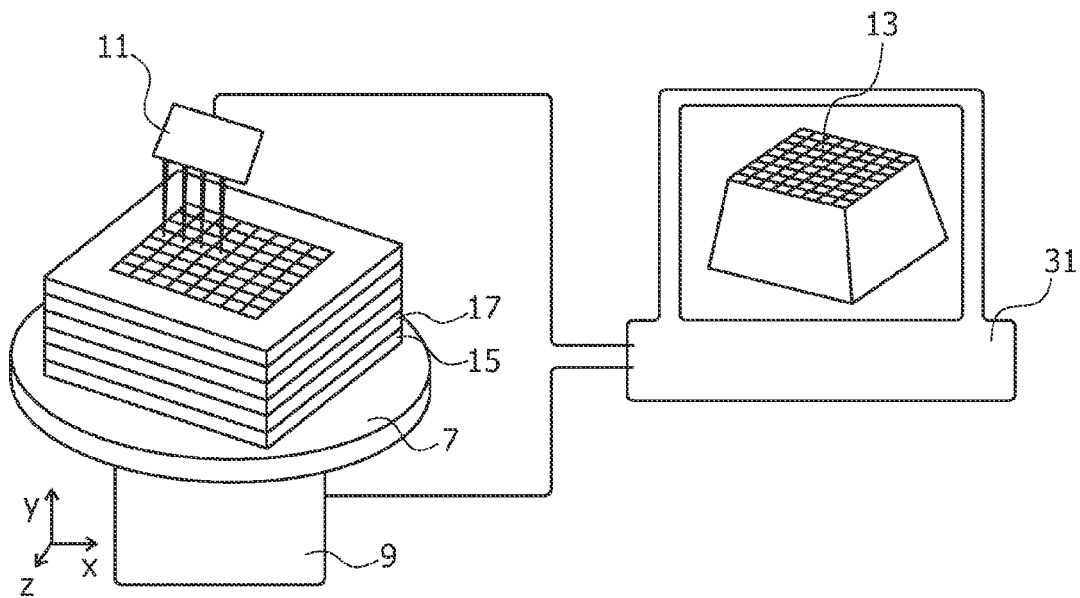
FIG. 2 schematically depicts a manufacturing method for a grid structure according to an embodiment of the present invention.

As schematically shown in FIG. 2, the structural element 2 can be built using a selective laser sintering technique. Therein, particles of a radiation-absorbing material are placed on a substrate 7. The substrate 7 is positioned on a table 9 which can be moved in the y-direction. Using a single laser and, optional, an arrangement for deflecting the laser beam or alternatively using a laser array 11, the particles may be sintered to each other at the location(s) of the focus of one or more laser beams. The laser array 11 may be controlled such that the location(s) of the focus of the one or more laser beams are scanned in x- and z-directions over the surface of the substrate in accordance with a 3-dimensional model 13 stored on a control unit 31 connected both to the laser array 11 and the table 9. After having scribed a first layer 15 of sintered particles, the table 9 can be moved downwards, the particles can be again evenly distributed over the surface of the already existing sintered structure and a second layer 17 of sintered particles can be generated using the laser array 11. Accordingly, the 3-dimensional model 13 stored in the control unit 31 may be reproduced by sintering particles layer-by-layer.

Figures 4A, 4B:
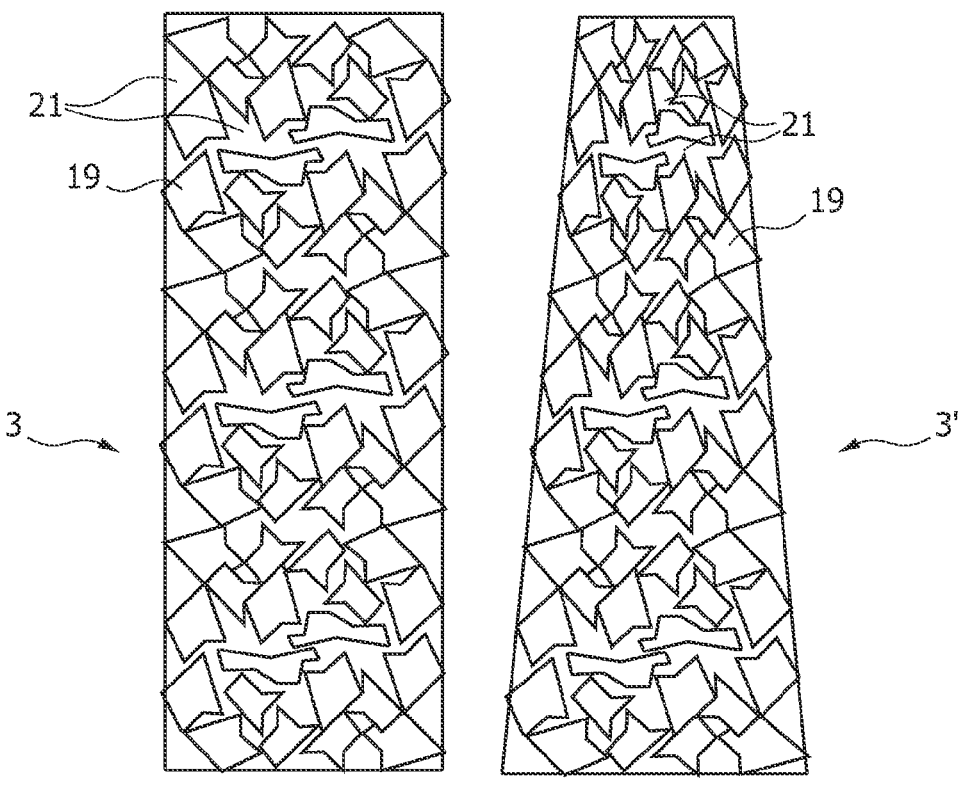
FIGS. 4a and 4b show sectional views of walls within a grid structure according to an embodiment of the present invention.

After having prepared the structural element 2, the pores between neighbouring particles may be filled by dipping the structural element 2 into a bath of molten metal. In FIGS. 4a and 4b, magnified sectional views of the walls 3, 3' included in the structural element 2 are shown. The walls may have a rectangular cross-section as shown in FIG. 4a or a wedge-like cross-section as shown in FIG. 4b. Particles 19 of radiation-absorbing material such as molybdenum or tungsten are sintered together. Pores 21 both at the inside of the wall 5, 5' as well as at its surface are filled with a solidified radiation-absorbing material such as silver or lead.

Furthermore, an alternative exemplary embodiment of a method of manufacturing a grid 1' for selective transmission of electromagnetic radiation according to the invention will be described with reference to FIG. 3.

In a first step, a metal sheet 104 which is made for example from molybdenum or tungsten is positioned in a working chamber of a selective laser sintering device. The precise positioning with respect to the position of the laser beam of the SLS device may be achieved by a previous system calibration. The metal sheet may be reversibly glued into the working chamber for fixation. After a layer of metal powder is arranged on the metal sheet, selective laser sintering is used to sinter a first layer of a sintered structure to be manufactured. After the first layer is completed, a next layer of metal powder is arranged on top of the metal sheet and the previously sintered structures. This can be combined with a slight tilt of the working chamber so that the next layer that is sintered has a predetermined angulation with respect to the metal sheet.

Figure 3:
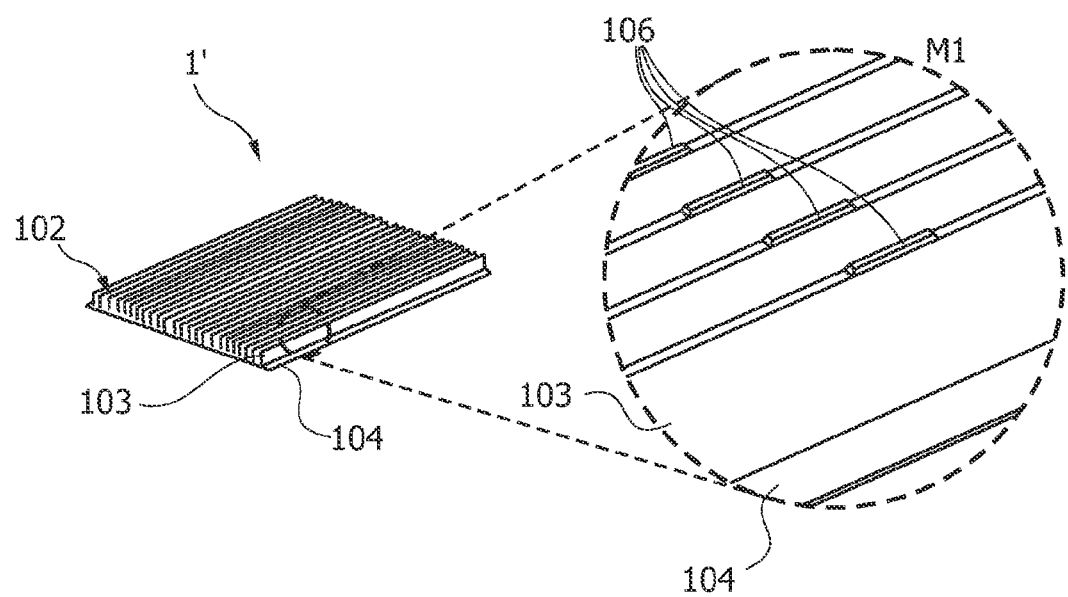
FIG. 3 shows an elevated perspective view of a comb-like grid structure according to an alternative embodiment of the present invention.

FIG. 3 shows on the left-hand side a comb-like grid structure 102 that results after several layers of metal powder have been sintered. On the right-hand side of FIG. 3, a magnification M1 of a portion of the comb-like structure as indicated by the circle on the left-hand side of FIG. 3 is shown. The comb-like structure has a base that is formed by a metal sheet 104. Sintered longitudinal wall structures 103 are shown that extend over the length of the metal sheet 104. On top of the walls 103, alignment structures 106 are depicted.

It has to be noted that the use of a metal sheet 104 as a base substrate is not mandatory. Alternatively, the entire grid may be made from a structural element which is completely prepared by sintering.

Figure 5:
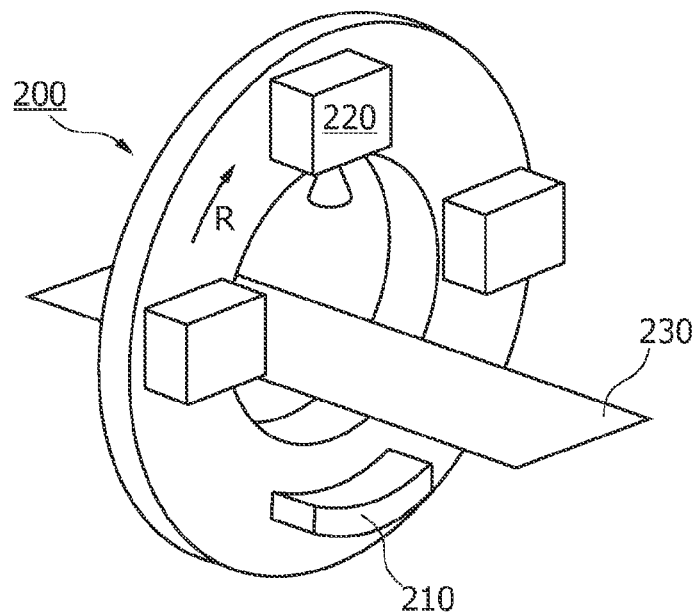
FIG. 5 shows a perspective view of an example of a medical imaging device with a grid according to an embodiment of the present invention.

In FIG. 5, an example of a medical imaging device 200 is shown. FIG. 5 shows the main features of a CT scanner, namely an X-ray source 220, a radiation detector 210 and a patient couch 230. The CT scanner may rotate around the object to be observed and may acquire projection images by means of radiation detection using the detector 210. A grid as described above according to the invention can be used in the detector 210 to reduce the amount of scatter radiation generated in the object to be observed.

Finally, it should be noted that the terms "comprising", "including", etc. do not exclude other elements or steps and the terms "a" or "an" do not exclude a plurality of elements. Also, elements described in association with different embodiments may be combined. It should also be noted that reference signs in the claims should not be construed as limiting the scope of the claims.

The invention claimed is:

1. A method of manufacturing a grid for selective transmission of electromagnetic radiation, the method comprising:
providing a structural element that has minimum structure dimensios and comprises a plurality of particles of a first radiation-absorbing material, wherein at least 90% of all particles of the plurality of particles have a maximum particle size larger than 10% of the minimum structure dimensions, further wherein the particles are sintered together and pores are present between neighbouring particles;
inserting a liquid second material into the pores, wherein the second material has a melting temperature lower than a melting temperature of the first radiation-absorbing material; and
solidifying the second material.

2. The method according to claim 1, wherein the liquid second material comprises a radiation-absorbing material.

3. The method according to claim 1, wherein the particles of the first radiation-absorbing material are sintered together by selective laser sintering.

4. The method according to claim 1, wherein the liquid second material is inserted into the pores by dipping the structural element into a bath of liquefied material.

5. The method according to claim 1, wherein the liquid second material is liquefied by melting.

6. A grid for selective transmission of electromagnetic radiation comprising a structural element that has minimum structure dimensions and comprises a plurality of particles of a first radiation-absorbing material, wherein at least 90% of all particles of the plurality of particles are larger than 10% of the minimum structure dimensions, further wherein the particles are sintered together such that pores are present between neighbouring particles and wherein the pores are at least partially filled with a second solid material, and further wherein the second material has a melting temperature lower than a melting temperature of the first radiation-absorbing material.

7. The grid according to claim 6, wherein the second material is a radiation-absorbing material.

8. The grid according to claim 6, wherein the second material is a metal.

9. The grid of according to claim 6, wherein the second material is selected out of a group consisting of of silver, lead, copper and alloys thereof.

10. The grid of according to claim 6, wherein the first radiation-absorbing material is selected out of a group comprising molybdenum and tungsten.

11. A medical imaging device comprising a grid according to claim 6.

* * * * *